United States Patent
Chen et al.

(10) Patent No.: US 9,258,838 B2
(45) Date of Patent: Feb. 9, 2016

(54) COMMUNICATION APPARATUS AND A TIMING METHOD THEREOF

(75) Inventors: Hsi-Feng Chen, Zhudong Township, Hsinchu County (TW); Chun-Ying Wu, New Taipei (TW); Xinwei Cui, Beijing (CN); Zhaokun Dong, Tianjin (CN); Yang Yang, Beijing (CN); Ming-Chun Cheng, Taoyuan (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 13/635,217

(22) PCT Filed: Sep. 3, 2012

(86) PCT No.: PCT/CN2012/080923
§ 371 (c)(1),
(2), (4) Date: Oct. 17, 2012

(87) PCT Pub. No.: WO2013/029568
PCT Pub. Date: Mar. 7, 2013

(65) Prior Publication Data
US 2014/0200042 A1 Jul. 17, 2014

(30) Foreign Application Priority Data

Sep. 2, 2011 (CN) .......................... 2011 1 0258226

(51) Int. Cl.
*H04W 76/02* (2009.01)
*H04W 56/00* (2009.01)
*H04W 88/06* (2009.01)

(52) U.S. Cl.
CPC ........ *H04W 76/025* (2013.01); *H04W 56/0015* (2013.01); *H04W 88/06* (2013.01)

(58) Field of Classification Search
CPC ..... H04W 36/14; H04W 88/06; H04W 24/00; H04W 36/30; H04W 36/18; H04W 60/04; H04W 92/02; H04W 52/028; H04W 80/04; H04W 52/0274; H04W 52/0209; H04W 92/00; H04W 52/0245; H04W 68/00; H04W 80/00; H04W 84/12; H04M 1/2535; H04M 2250/06; H04M 2207/18; H04L 12/66; H04L 47/805
USPC .......... 455/41.2, 432.1, 423, 436–444, 552.1, 455/550.1, 553.1; 370/338, 241, 254, 465, 370/331–333
See application file for complete search history.

(56) References Cited

U.S. PATENT DOCUMENTS 7,099,309 B2 * 8/2006 Davidson ...................... 370/352
7,991,399 B2    8/2011 Ganesan
(Continued)

FOREIGN PATENT DOCUMENTS

| CN | 1981540 | 6/2007 |
| CN | 101150842 | 3/2008 |
| CN | 101854650 | 10/2010 |

OTHER PUBLICATIONS

English language translation of abstract of CN 101150842 (published Mar. 26, 2008).
(Continued)

*Primary Examiner* — Sujatha Sharma
(74) *Attorney, Agent, or Firm* — McClure, Qualey & Rodack, LLP

(57) ABSTRACT

A timing method and communication apparatus therefor. The timing method, performed by a mobile communication device, includes: activating a first communication module; receiving updated information when the first communication module is active; determining and setting an expiry time for an adaptive timer based on the updated information; activating the adaptive timer to count to the determined expiry time; and activating a second communication module when the adaptive timer expires.

20 Claims, 5 Drawing Sheets

(56) References Cited

U.S. PATENT DOCUMENTS

| | | | |
|---|---|---|---|
| 8,078,164 B2 * | 12/2011 | Ganesan | 455/432.1 |
| 8,249,590 B2 * | 8/2012 | Govindarajan et al. | 455/434 |
| 8,457,030 B2 * | 6/2013 | Chen | 370/311 |
| 8,588,174 B2 * | 11/2013 | Shatsky | 370/331 |
| 8,725,148 B2 * | 5/2014 | George et al. | 455/436 |
| 2011/0171909 A1 | 7/2011 | Jung et al. | |

OTHER PUBLICATIONS

English language translation of abstract of CN 101854650 (published Oct. 6, 2010).

* cited by examiner

COMMUNICATION APPARATUS AND A TIMING METHOD THEREOF

CROSS-REFERENCE TO RELATED APPLICATION

This application is a co-pending application which claims priority to PCT Application No. PCT/CN2012/080923, filed Sep. 3, 2012, entitled "Communication Apparatus and a Timing Method Thereof" herein incorporated by reference in its entirety. This application also claims priority to, and the benefit of, Chinese patent application 201110258226.8, filed Sep. 2, 2011, herein incorporated by reference in its entirety.

BACKGROUND OF THE INVENTION

1. Field of the Invention

The present invention relates to telecommunication, and in particular relates to a time-to-digital converter realized by a communication apparatus and a timing method thereof.

2. Description of the Related Art

Communication devices are equipped with a dual or multi-communication mode to accommodate a range of different service networks such as a wireless local area network (WLAN or WiFi) technology, Time Division Duplex or Frequency Division Duplex Long Term Evolution (TDD-LTE, FDD-LTE) technology, Global System for Mobile communication (GSM) technology, Time Division-Synchronous Code Division Multiple Access (TD-SCDMA) technology, Wideband Code Division Multiple Access (WCDMA) technology, Code Division Multiple Access 2000 (CDMA 2000) technology, or Worldwide Interoperability for Microwave Access (WiMAX) service network, allowing users to shift from network to network using a single communication device.

BRIEF SUMMARY OF THE INVENTION

A detailed description is given in the following embodiments with reference to the accompanying drawings.

A timing method is disclosed, performed by a mobile communication device, comprising: activating a first communication module; receiving updated information when the first communication module is active; determining and setting an expiry time for an adaptive timer based on the updated information; activating the adaptive timer to count to the determined expiry time; and activating a second communication module when the adaptive timer expires.

Another communication apparatus in a mobile communication device is provided, comprising a first communication module, a second communication module, an adaptive timer and a controller. The first communication module is configured to be activated. The controller, comprising an adaptive timer, configured to receive updated information when the first communication module is active, determines and sets an expiry time for the adaptive timer based on the updated information, and activates the adaptive timer to count to the determined expiry time. The second communication module is configured to be activated when the adaptive timer expires.

BRIEF DESCRIPTION OF DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
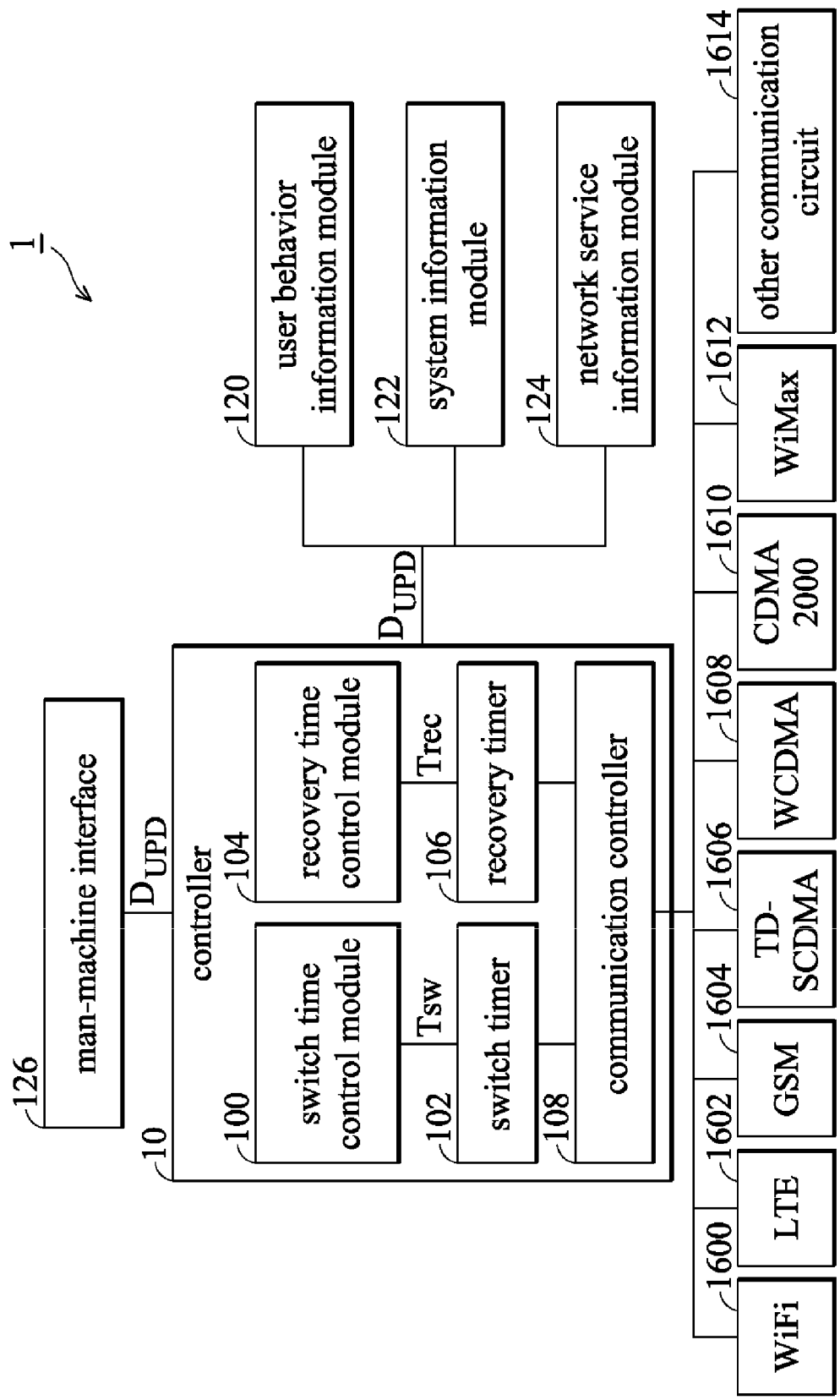
FIG. 1 is a block diagram according to an embodiment of the invention.

FIG. 1 is a block diagram of a communication apparatus 1 according to an embodiment of the invention. The present invention can be implemented in software, firmware or hardware. Taking Hardware implementation for example, FIG. 1 can be a block diagram of a communication apparatus 1. The communication apparatus 1 can be incorporated in a mobile communication device such as a tablet computer, a smart phone, or a laptop computer. The communication apparatus 1, comprising a plurality of communication modules supporting multiple types of communication technologies, can be selected from one or more than one of all available communication modules, to control all incoming and outgoing communications, while placing unselected communication modules into standby, sleep or inactive states automatically. The selection of the communication modules can be based on priorities of the available communication technologies set on the mobile communication device. The communication apparatus 1 may switch from a current to a next communication module based on a change detected from the surrounding environment. Specifically, upon detection of a change in the selected service network or the communication device system, the communication apparatus 1 can determine an expiry time for counting down of an adaptive timer to activate the next priority communication module. The length of the expiry time is associated with the detected external change to the mobile communication device including a network connection status, a user interface status, a network information, a motion of the mobile communication device, a pattern of a user behavior, and other network and system information. The adaptive timers in the communication apparatus 1 may be of two types, namely, a switch timer 102 and a recovery timer 106. The switch timer 102 can count a first time interval of the expiry time and switch to the next priority communication network upon expiry. The recovery timer 106 can count a second time interval of the expiry time and scan for a higher priority communication network upon expiry. The expiry times for the adaptive timers can be updated as soon as an external change has been detected.

Accordingly, the communication apparatus 1 contains a plurality of communication modules to be selected from a wireless local area network (WLAN or WiFi) module 1600, a Long Term Evolution (LTE) module 1602, Global System for Mobile communication (GSM) module 1604, Time Division-Synchronous Code Division Multiple Access (TD-SCDMA) module 1606, Wideband Code Division Multiple Access (WCDMA) module 1608, Code Division Multiple Access 2000 (CDMA 2000) module 1610, Worldwide Interoperability for Microwave Access (WiMAX) module 1612, and other communication modules 1614. Further, the communication apparatus 1 also contains a controller 10, a user behavior information module 120, a system information module 122, a network service information module 124, and a man-machine interface 126. The communication modules 1600 through 1614 can contain RF and baseband modules for the designated types of the service networks.

The controller 10 can collect updated information $D_{UPD}$ from the user behavior information module 120, the system information module 122, the network service information module 124, the man-machine interface 126, and all communication modules 1600 through 1614. The updated information $D_{UPD}$ include a network connection status, a user interface status, a quality of service information, a network traffic rate information, a service type information, a motion information, a network information, a system information, and a pattern of user behavior information. The user behavior information module 120 can supply the pattern of user behavior information in the form of a data, file, or database. The system information module 122 can provide the system information such as the service type information, the motion information, and other system information for the mobile communication device. The network service information module 124 can provide the network connection status, the quality of service information, the network traffic rate information, the neighbor cell information, and other network information. The man-machine interface 126 can deliver the motion information and the service type information to the controller 10. The man-machine interface 126, or the user interface, may be a user graphical interface, a touch screen, a motion tracking interface, and other user interfaces.

The controller 10 contains a switch time control module 100, the switch timer 102, a recovery time control module 104, the recovery timer 106, and a communication controller 108. The switch time control module 100 is coupled to the switch timer 102, the recovery time control module 104 is coupled to the recovery timer 106. Both the switch timer 102 and the recovery timer 106 are coupled to the communication controller 108. The switch time control module 100 can obtain the updated information $D_{UPD}$ from the user behavior information module 120, the system information module 122, the network service information module 124, and the man-machine interface 126, and then determine the length of the switch time Tsw based on the updated information $D_{UPD}$, and set the switch time Tsw to the switch timer 102. Likewise, the recovery time control module 104 can obtain the updated information $D_{UPD}$ from modules 120 through 126, and then determine the length of the recovery time Trec based on the updated information $D_{UPD}$, and set the recovery time Trec to the recovery timer 106. The communication controller 108 can determine which of the communication modules 1600 to 1614 are to be activated and which are to be deactivated upon expiry of the switch timer 102 or the recovery timer 106. The switch timer 102 can count to the switch time Tsw to switch to the next priority service network. The recovery timer 106 can count to the recovery time Trec to scan for the availability of a higher priority service network. In some embodiments, the switch timer 102 includes a plurality of timers, wherein each can count to the switch time Tsw for designated communication modules. In other embodiments, the switch timer 102 includes only one timer counting to the switch time Tsw for the present active communication module. The recovery timer 106 can contain a plurality of timers, wherein each can be designated to a communication module, counting to the corresponding recovery time Trec for the immediate higher priority service network of the designated communication module.

The communication apparatus 1 can dynamically configure the switch time Tsw for the switch timer 102 and configure the recovery time Trec for the recovery timer 106 according to the updated information $D_{UPD}$, allowing for adaptive switch and recovery time control that accounts for various network, system, and user behavior changes.

Figure 2:
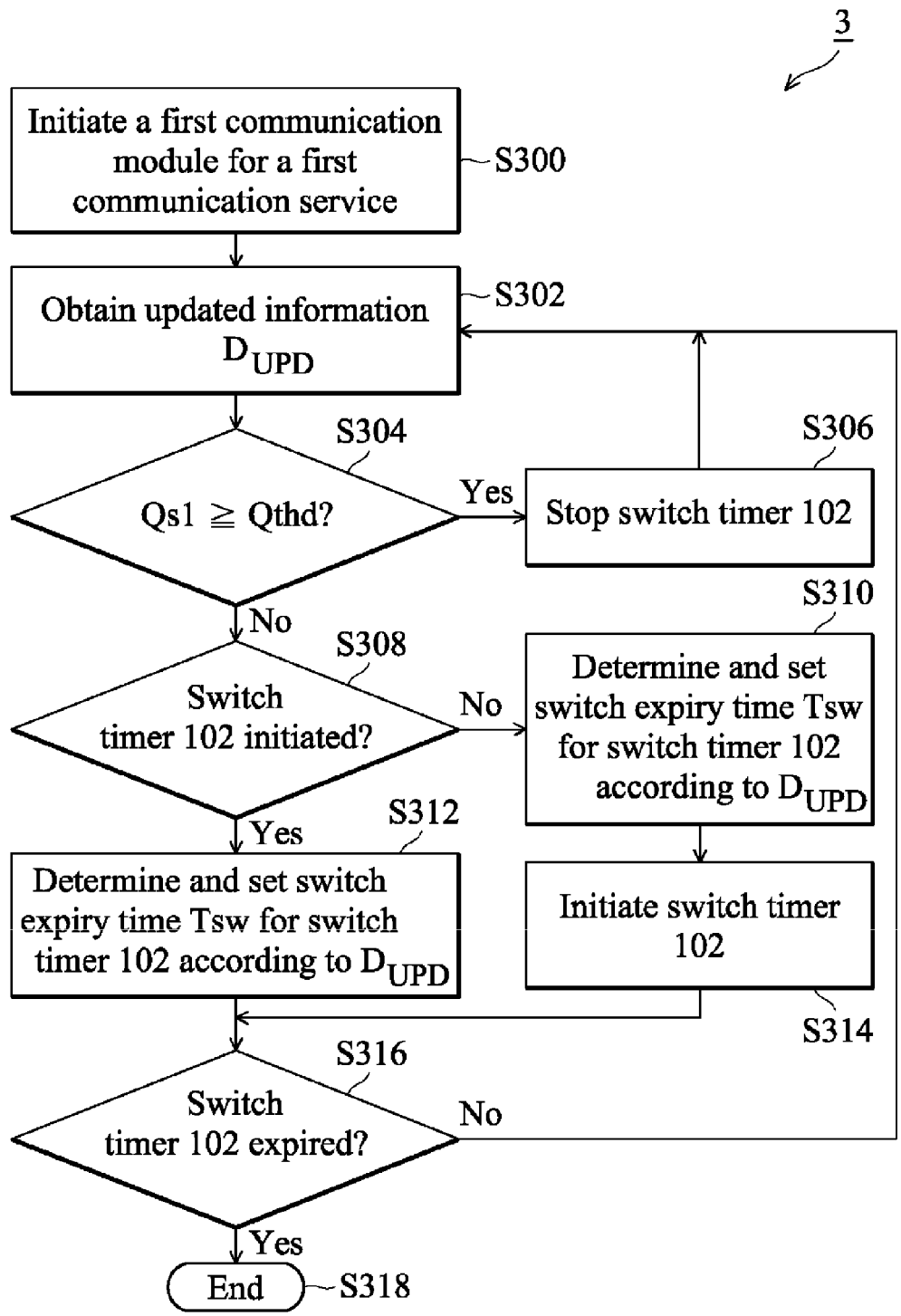
FIG. 2 is a flowchart of a timing method 3 according to another embodiment of the invention.

FIG. 2 is a flowchart of a timing method 3 according to another embodiment of the invention, incorporating the communication apparatus 1 in FIG. 1, dynamically determining a switch time Tsw for the switch timer 102.

Upon startup, the communication controller 108 can determine a first communication module as a top priority among the communication modules 1600 to 1614 and initiate the first communication module for a first network service in the designated network (S300). Once the first communication module is in operation, a first connection is established between the first communication module and the designated network, and the first communication module is ready to obtain updated information $D_{UPD}$ from the designated network, the man-machine interface 126, or the established data or database in the memory 12 (S302). The updated information $D_{UPD}$ may be, for example, a network connection status, a user interface status, a quality of service information, a network traffic rate information, a service network information, a system network information, and a pattern of user behavior. In some embodiments, the first communication module can receive control messages from the designated network, from which the signal information and/or the network information can be derived, by the network service information module 124. In other embodiments, the man-machine interface 126 can detect which of the user interfaces is being used and a motion of the mobile communication device. In yet other embodiments, the system information module 122 can determine a service type in association with the user interface being used. In still other embodiments, the user behavior information module 120 can establish data or a database for the pattern of user behavior based on the history of the network service requests in the past.

In Step S304, the timing method 3 can further measure a signal quality Qs1 from the received signal by the first communication module. The signal quality Qs1 may be indicated by signal strength, expressed by a received signal strength indicator (RSSI), a Reference Signal Receiving Power (RSRP), a Received Signal Code Power (RSCP), or other signal strength representation. The controller 10 can obtain the signal quality Qs1 from the first communication module, and compare the signal quality Qs1 to a signal quality threshold Qthd which is set as a minimal signal quality that the received signal can be processed and decoded (S304). When the signal quality Qs1 exceeds the signal quality threshold Qthd, the first service network can provide satisfactory services to the first communication module. There is no need to switch to an alternate service network, thus the controller 10 can stop the switch timer 102 (S306). When the signal quality Qs1 is less than the signal quality threshold Qthd, the first service network fails to provide satisfactory services to the first communication module, thus, the controller 10 can look for another alternate service network for acquiring network services. The controller 10 can further determine whether the switch timer 102 is activated (S308). When the switch timer 102 is inactive, the switch time control module 100 can determine and set the switch time Tsw for the switch timer 102 according to the updated information $D_{UPD}$ (S310), and then initiate the switch timer 102 to count down for switching to the next priority service network (S314).

When the switch timer is already active, the switch time control module 100 can determine and update the switch time Tsw for the switch timer 102 according to the updated information $D_{UPD}$ (S312). In some embodiments, the updated information $D_{UPD}$ comprises a plurality of sub-information $D_{UPD1}$, $D_{UPD2}$, ..., $D_{UPDn}$ to be used in a plurality of sub-conditions, wherein a priority is assigned to each sub-condition. The switch time control module 100 can determine a validity of each sub-condition and determine the switch time Tsw based on the priorities and the validates of all sub-conditions. Specifically, the switch time control module 100 can determine the switch time Tsw based on the valid sub-condition with the highest priority.

Some embodiments for the sub-conditions are provided as follows to illustrate how the switch time control module 100 can determine that the switch time Tsw for the designated switch timer 102.

In some embodiments, the switch time Tsw may be configured for the switch timer 102 according to a connection status to a service network. The network service information module 124 can determine a disconnection status based on received control messages indicating that the mobile communication device has been disconnected from the service network. The disconnection message may be initiated by the mobile communication device, e.g., the user turns off the service network from the user equipment. In some embodiments, when the sub-condition that the connection status being disconnected is valid, the switch time control module 100 can configure the expiry time Tsw for the switch timer 102 to a first expiry time T1, wherein the first expiry time T1 may be a zero or non-zero number. When the first expiry time T1 is 0, the switch timer 102 is set to expire immediately and the communication apparatus 1 switches to the next priority network option.

In other embodiments, the switch time control module 100 can determine that the switch time Tsw according to an interface status of the man-machine interface 126. For example, when the user is using a user graphical interface on the mobile communication device, or a keypad lock of the mobile communication device is unlocked, the expiry time Tsw for the adaptive timer can be changed by setting the expiry time Tsw to a second expiry time T2. In some implementations, when the interface status is active, the switch time Tsw is reduced in order to decrease the waiting time for a network connection.

In yet other embodiments, the switch time Tsw may be configured according to a Quality of Service (QoS) for an active network service. When the QoS indicates a real-time service request such as a Voice over IP (VoIP) service, the switch time Tsw can be reduced to a third expiry time T3, reducing the reconnection time to a service network.

In still other embodiments, the switch time Tsw may be configured according to a network traffic rate. The communication apparatus 1 can obtain information on the network traffic rate from the accessed network system. When the sub-condition that the network traffic rate exceeds a traffic rate threshold $TR_{thd}$ (not shown) is valid, the switch time Tsw for the switch timer 102 can be reduced to a fourth expiry time T4.

In still yet other embodiments, the switch time Tsw may be configured according to a pattern of user behavior in using the service networks. For example, the user behavior information module 120 can record a history of login networks and login times in a file or a database, so that the switch time control module 100 can determine that the switch time Tsw according to the file or database. In some implementations, when a sub-condition where a current login time falls within a time interval for which the user had previously signed into the first communication module, is valid, the switch time control module 100 can reduce the switch time Tsw to a fifth expiry time T5, reducing the waiting time for a network connection. Conversely, when a sub-condition where the current login time falls outside of the time interval for which the user had previously signed into the first communication module, is valid, the switch time control module 100 can increase the switch time Tsw to a sixth expiry time T6.

Referring now to Step S312, the switch time control module 100 can determine all sub-conditions after detecting one or more updated information $D_{UPD}$. In some embodiments, the switch time control module 100 can determine all sub-conditions concurrently, and then determine a highest priority selection among all valid sub-conditions for providing the switch time Tsw. For example, in the preceding embodiments, the 6 sub-conditions, corresponding to the 6 expiry times T1 to T6, can be assigned in an order of decreasing priorities, with the first sub-condition being set to the highest priority and the sixth sub-condition being set to the lowest priority. The switch time control module 100 can set the switch time Tsw to be the third expiry time T3 upon a valid third sub-condition and invalid first and second sub-conditions, regardless of the fourth and fifth sub-conditions being valid or invalid. Alternately, the switch time control module 100 can determine that the sub-condition one by one in the priority order, wherein the first valid sub-condition can be used to determine the switch time Tsw. For example, the switch time control module 100 has to invalidate the first and second sub-conditions before setting the third expiry time T3 to the switch time Tsw to account for the valid third sub-condition. Once the switch time Tsw is set by the third sub-condition, the switch time control module 100 can cease to verify the remaining fourth to sixth sub-conditions.

Next in Step S316, the communication controller 108 can determine whether the switch timer 102 has expired. If not, the timing method 3 can return to Step S302 to wait for any updated information DUPD. When the switch timer 102 has expired, the switch time Tsw of the switch timer 102 may be restored to a default value. The timing method 3 is then completed and exited (S318).

In some implementations, the signal quality threshold Qthd is configurable, and may be configured to a large number, so that the signal quality Qs1 is always less than the signal quality threshold Qthd, or Steps S304 and S306 can be omitted from the method 3 completely. As a consequence, upon detecting an updated information $D_{UPD}$, the switch time control module 100 can always determine the expiry time Tsw for the switch timer 102 based on the updated information $D_{UPD}$.

The timing method 3 can dynamically configure the switch time Tsw for the switch timer 102 according to the updated information $D_{UPD}$ when the signal quality in a current service network decreases, allowing for an adaptive switch time that accounts for various network, system, and user behavior changes to be used to switch to other service networks.

Figure 3:
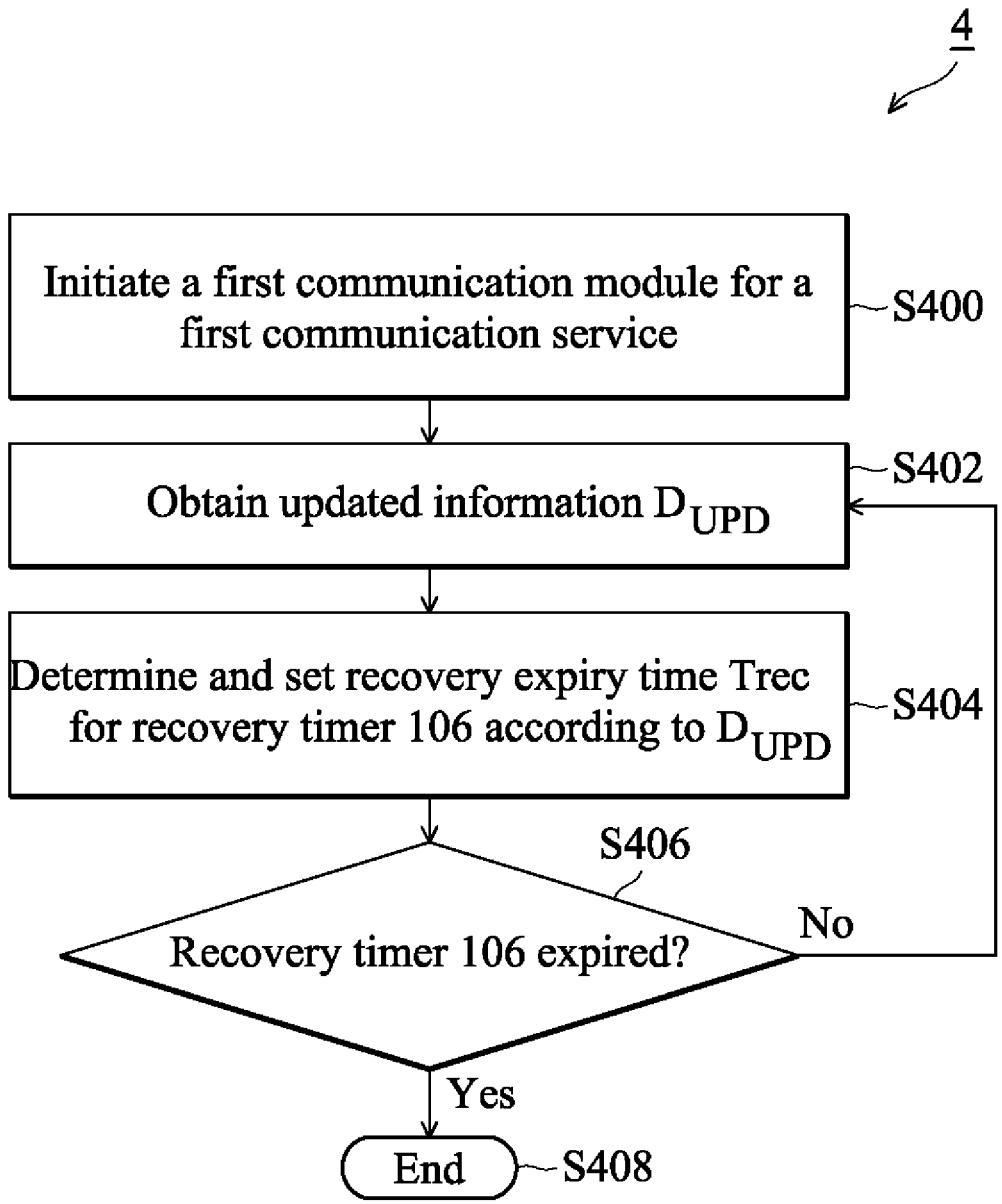
FIG. 3 is a flowchart of a timing method 4 according to another embodiment of the invention.

FIG. 3 is a flowchart of a timing method 4 according to an embodiment of the invention, incorporating the communication apparatus 1 in FIG. 1, dynamically determining a recovery time Trec for the recovery timer 106.

Steps S400 and S402 are identical to steps S300 and S302, thus, reference may be made the preceding paragraphs and are not repeated here. In Step S404, the recovery time control module 104 can determine and set a recovery time Trec for the recovery timer 106 according to all or a part of the obtained updated information $D_{UPD}$. The updated information $D_{UPD}$ comprises a plurality of sub-information $D_{UPD1}$, $D_{UPD2}$, ..., $D_{UPDn}$ to be used in a plurality of sub-conditions. The recovery time control module 104 can determine each sub-condition for each sub-information, assign weights to the all determined sub-conditions, and determine the recovery time Trec based on all assigned weights. For example, the recovery time Trec may be determined based on weights A, B, C, D, E, and F corresponding to 6 sub-conditions, with a maximal sum of all weights equaling to 1 (A+B+C+D+E+F=1), and A, B, C, D, E, and F all exceeding 0. The recovery timer 106 is activated when the first communication module experiences a network disconnection from the present first service network, or when the updated information $D_{UPD}$ is detected or obtained.

In some embodiments, the recovery time Trec can set the expiration time for the recovery timer 106 upon the network disconnection. The recovery time Trec may be determined according to Eq. [1]:

$$Trec = T_{base} - (T_{base} - T_{min})S1 + (T_{max} - T_{base})S2 \quad \text{Eq. [1]}$$

where S1 is a decreased sum of all weights decreasing the recovery time Trec;

S2 is an increased sum of all weights increasing the recovery time Trec;

$T_{base}$ is a default value for the recovery time Trec;

$T_{min}$ is a minimal value for the recovery time Trec; and $T_{max}$ is a maximal value for the recovery time Trec;

Accordingly, the equation Eq. [1] shows that when a weight Y contributes to a decreased recovery time Trec, the term $-(T_{base}-T_{min})Y$ is the length of the decreased recovery time Trec. Conversely, when the weight Y contributes to an increased recovery time Trec, the term $(T_{max}-T_{base})Y$ is the length of the increased recovery time Trec. When the weight Y has no effect on the recovery time Trec, the recovery time Trec is $T_{base}$.

In other embodiments, the recovery time Trec can set the expiration time for the recovery timer 106 upon a change in the updated information $D_{UPD}$. The recovery time Trec may be determined according to Eq. [2] and Eq. [3]:

$$Trec = Trec - (T_{base} - T_{min})Yk \quad \text{Eq. [2]}$$

$$Trec = Trec + (T_{max} - T_{base})Yk \quad \text{Eq. [3]}$$

where Y is a weight corresponding to the updated information $D_{UPD}$;

k is a sub-factor scaling a change step in the recovery time Trec, 0<k<1;

$T_{base}$ is a default value for the recovery time Trec;

$T_{min}$ is a minimal value for the recovery time Trec; and $T_{max}$ is a maximal value for the recovery time Trec;

Embodiments for the updated information DUPD and the corresponding sub-conditions are provided as follows, to illustrate how the recovery time control module 104 can determine that the recovery time Trec for the designated recovery timer 106 based on Eqs. [1], [2], or [3].

In some embodiments, the recovery time Trec can be configured by the man-machine interface 126 according to the pattern of the user behavior. Accordingly, the user behavior information module 120 can keep a record of the login history including a time interval for which a user accesses a Packet-Switched (PS) service network. The user behavior information module 120 can determine that the pattern of the user behavior in using the PS service network, or the time interval in which the user is most likely to request for the PS service.

In other embodiments, the recovery time control module 104 can determine that the recovery time Trec for the recovery timer 106 based on an interface status of the man-machine interface 126. In some implementations, the recovery time control module 104 can determine that a PS service may be in need according to a type of the man-machine interface 126 in use. For example, the man-machine interface 126 can determine that a PS network is in need upon the user launching PS-associated applications such as a browser application or an email client. Based on the type of services in need, the recovery time control module 104 can increase or decrease the recovery time Trec for the recovery timer 106.

In other embodiments, the recovery time Trec can be configured by the man-machine interface 126 according to the service type and the network traffic rate of the network service. Details are provided as follows.

The recovery time Trec can be configured based on the service type of the network service being a real-time traffic or a non-real-time traffic. The real-time traffic requires accurate timing synchronization between the traffic source and destination, while the non-real-time traffic has no reliance on time synchronization between the traffic source and destination. When a network connection for the real-time service such as Voice Over IP (VoIP) is broken, the recovery time control module 104 is required to reduce the recovery time Trec to recover the connection in a reduced time interval to provide increased user experience. Contrarily, when a network connection for the non-real-time services such as a File Transfer Protocol (FTP) or browser applications is broken, the recovery time control module 104 can increase or leave the recovery time Trec unchanged without impacting the user experience. In some implementations, the network service information module 124 can determine a list of all service types in use on the mobile communication device, and inform the recovery time control module 104 of a strictest real-time service from the list for determining the recovery time Trec. For example, the network service information module 124 can classify all network services into AP_Traffic_Class1, AP_Traffic_Class2, AP_Traffic_Class3, AP_Traffic_Class4, AP_Traffic_Class5, . . . , AP_Traffic_Classn, with the AP_Traffic_Class1 requiring the strictest real-time latency while the AP_Traffic_Classn requiring the lowest. The recovery time control module 104 can reduce the recovery time Trec with an increased real-time latency of the network service, and increase the recovery time Trec with a decreased real-time latency of the network service.

The recovery time Trec can be configured based on the network traffic rate. Upon determination of a considerably increased network traffic rate, the recovery time control module 104 can determine that the selected communication module is in communication with a service network, and possible in the middle of an ongoing PS service. As a consequence, the communication apparatus 1 is required to perform network recovery in a reduced time after a network disconnection, rendering increased user experience. The network service information module 124 can determine and inform the recovery time control module 104 of the current network traffic rate for determining the recovery time Trec. For example, the network service information module 124 can classify all network traffic rates into AP_Traffic_Rate1, AP_Traffic_Rate2, AP_Traffic_Rate3, AP_Traffic_Rate4, AP_Traffic_Rate5, . . . , AP_Traffic_Raten, with the AP_Traffic_Rate1 being the most reduced network traffic rate and the AP_Traffic_Raten being the most increased traffic rate. The recovery time control module 104 can reduce the recovery time Trec with the increased network traffic rate, and increase the recovery time Trec with the decreased network traffic rate.

In yet other embodiments, the recovery time Trec can be configured by the man-machine interface 126 according to the system status from the system information module 122. The system status may include the interface status for the PS service and a motion of the mobile communication device. The interface status for the PS service may be determined by the man-machine interface 126 detecting the PS-associated applications. The motion of the mobile communication device may be determined by a Global Positioning System (GPS) or an assisted-GPS (A-GPS) application, system messages broadcasted by the detected or new neighboring cells, or a handover condition. The detailed descriptions for how the recovery time control module 104 can utilize the system status to determine the recovery time Trec are outlined as follows.

In some implementations, the communication module in use can receive a system message including other available communication modules capable of supporting PS services, and the recovery time Trec can be increased, to account for other available communication modules for sharing the PS traffic.

In other implementations, when the higher communication module was disconnected due to reduced signal quality, the mobile communication device is required to search for a service network upon detecting a motion. The recovery time Trec can be decreased to reduce a time for reconnection. The motion may be detected by the GPS/A-GPS module or system messages through other connected communication modules. When the communication apparatus 1 is equipped with a GPS module module or an A-GPS application (not shown), the motion thereof can be detected by comparing estimated locations in time. For example, the GPS module module or the A-GPS application may determine that the mobile communication device has moved to a new position POS2 from a previous position POS1. When a distance of the new position POS2 and previous position POS1 occurs, the a communication apparatus 1 can determine that a motion has been detected, consequently the recovery time Trec can be decreased to reduce the reconnection latency. When the a communication apparatus 1 receives system messages inductive of a new cell, a handover, or a change in neighbor cells, the communication apparatus 1 can determine that a motion has been detected. As a consequence of the motion detection, the recovery time Trec can be decreased to reduce the reconnection latency.

Referring now to step S404, the recovery time control module 104 can determine all sub-conditions after detecting one or more updated information $D_{UPD}$. In some embodiments, the recovery time control module 104 can determine all sub-conditions concurrently, determine weights corresponding to the sub-conditions, and then determine the recovery time Trec based on all weights according to Eq. [1] in a case of the network disconnection or Eqs. [2] and [3] in a case for a new updated information $D_{UPD}$.

Next in step S406, the communication controller 108 can determine whether the recovery timer 106 has expired. If not, the timing method 4 can return to Step S402 to wait for another updated information $D_{UPD}$. When the recovery timer 106 has expired, the recovery time Trec of the recovery timer 106 may be restored to a default value. The timing method 4 is then completed and exited (S408).

The timing method 4 can dynamically configure the recovery time Trec for the recovery timer 102 according to the updated information $D_{UPD}$, allowing for an adaptive recovery time that accounts for various network, system, and user behavior changes.

Figure 4:
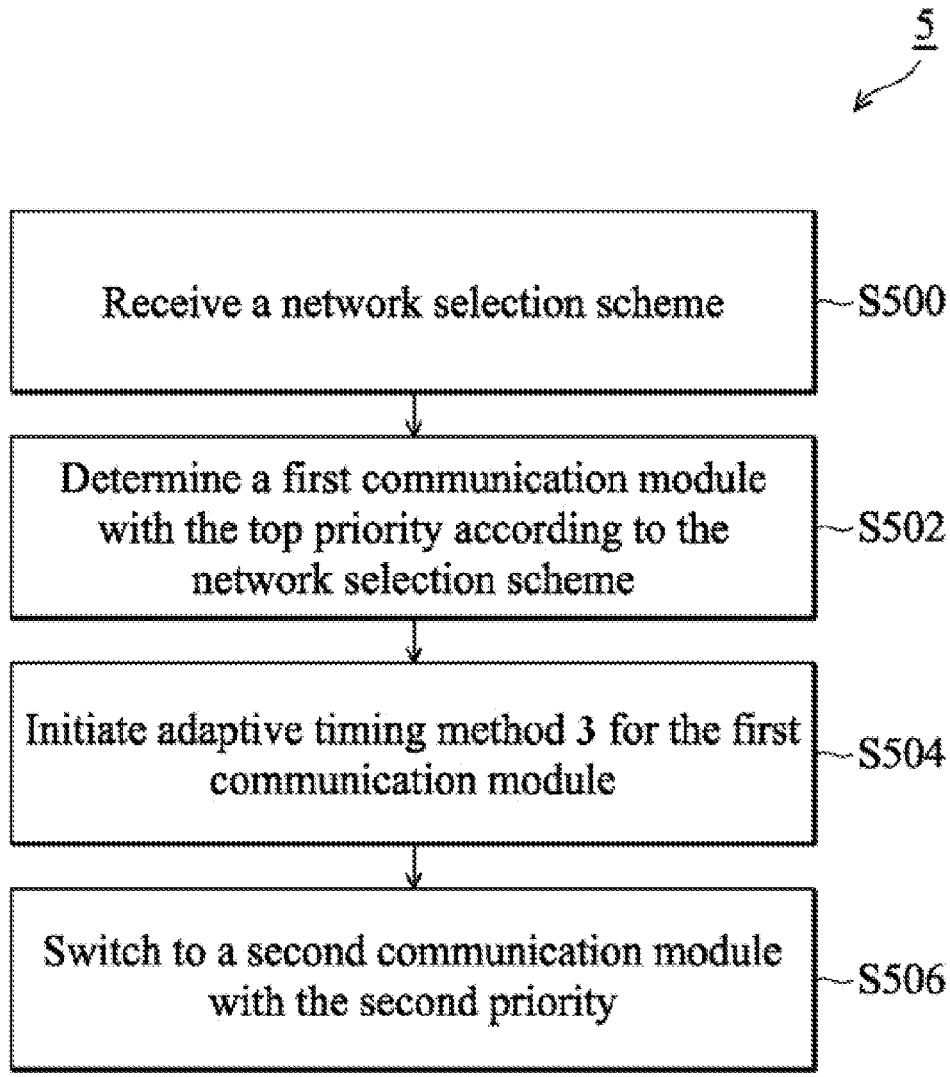
FIG. 4 is a flowchart of a network selection method 5 according to an embodiment of the invention.

FIG. 4 is a flowchart of a network selection method 5 according to an embodiment of the invention. The network selection method 5 incorporates the communication apparatus 1 in FIG. 1, and selects an activated communication module for providing network services.

Upon startup, the communication controller 108 can receive a network selection scheme from the man-machine interface 126 to select a communication module based on power saving, cost saving, or network performance (S500). Based on different criteria on power saving, cost saving, or network performance, the network selection scheme can assign a different priority order to the communication modules 1600 to 1614. The communication controller 108 can then determine a first communication module with the top priority according to the received network selection scheme (S502). For example, when the network selection scheme for power saving is received, the communication controller 108 can determine that the first communication module with the top priority in the power saving network selection scheme. The controller 10 can initiate the adaptive timing method 3 for determining a switch time Tsw for the switch timer 102 (S504). At expiry of the switch timer 102, the communication controller 108 can deactivate the first communication module and activate a second communication module with the second priority according to the network selection scheme (S506).

Figure 5:
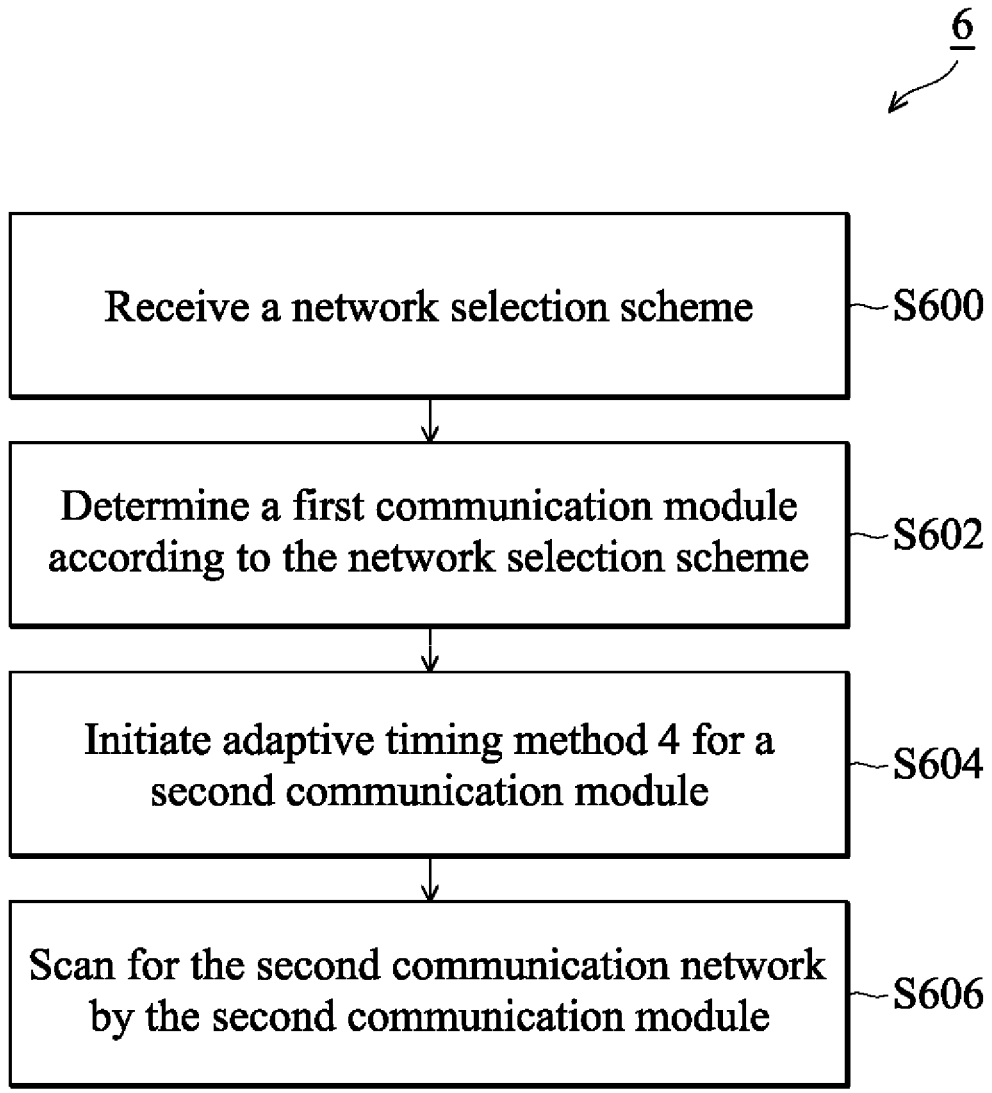
FIG. 5 is a flowchart of a network selection method 6 according to an embodiment of the invention.

FIG. 5 is a flowchart of a network selection method 6 according to an embodiment of the invention. The network selection method 6 incorporates the communication apparatus 1 in FIG. 1, and selects an activated communication module for providing network services.

Step S600 is identical to step S500, thus, reference may be made to the preceding paragraphs for explanation. The communication controller 108 can then determine a priority order based on the received network selection scheme. The communication controller 108 can activate a first communication module with a highest priority in all module candidates having accessible service networks (S602). In step S604, the controller 10 can initiate the adaptive timing method 4 for determining a recovery time Trec for each recovery timer 106 of each communication module. At expiry of any recovery timer 106, the communication controller 108 can activate a second communication module corresponding to the expired recovery timer 106, to scan for availability of a second service network to be recovered (S606). When the second service network is found, the communication controller 108 can deactivate the first communication module.

Details for how the priority order is determined based on the power saving, the cost saving, and the network performance are provided as follows.

The network selection scheme may select the communication module in the communication apparatus 1 based on power saving, thus, increasing battery life of the mobile communication device. When the user is not using a network or the user requests for a network service requiring a limited bandwidth, instead of a communication module with a good signal quality, the communication apparatus 1 can select a communication module with a good power saving capability for use, resulting in decreased power consumption for the mobile communication device.

When a screen is locked on the mobile communication device, the mobile communication device, running few basic background services, may no longer be in use by the user, thus, a communication module with a comparably large bandwidth and power requirement is not favored, rather, a communication module with limited bandwidth and power requirement is preferred. Thus, selection priorities are assigned to the communication modules according to the power saving capabilities, rendering a communication module with a good power saving capability being selected.

In some embodiments, when the network traffic rate has been reduced for a long time, or a log history on the mobile communication device shows that during a time interval, e.g., late night hours, only limited amounts of services were requested, the communication apparatus 1 can select a communication module with a good power saving capability for use, resulting in decreased power consumption for the mobile communication device.

When a remaining battery power is reduced below a power level, only a limited battery life remains for the battery, thus, the communication apparatus 1 can activate a communication module with a good power saving capability for use and deactivate a communication module with high power requirement, reducing power use in the mobile communication device.

Further, since multiple communication modules including WLAN, LTE, GSM, TD-SCDMA, WCDMA, CDMA 2000, and WiMAX modules are incorporated in the multi-mode mobile communication device, more than one communication module may be activated at a time, resulting in increased power consumption. Some implementations are provided to prevent more than one communication module from being activated concurrently. In some implementations, the communication apparatus 1 can reduce the rate of the channel scan or stop the channel scan performed by an unused communication module. During the idle period, a power supply of the unused communication module is turned off, reducing power requirements. In other implementations, the communication apparatus 1 can determine other accessible service networks through a communication module currently in use, preventing more than one communication module from being activated concurrently. In yet other implementations, the communication apparatus 1 can reduce the rate of a communication module switch when a communication module is already in connection to a service network, thereby reducing power consumption due to the module switch process.

The network selection scheme may select the communication module in the communication apparatus 1 based on cost saving, reducing a cost for using the network services. For the multi-mode mobile communication device, multiple service networks with different charging rates can be adopted. For example, the Wi-Fi network at home is free of charge, a TD-SCDMA network operated by a network operator requires a monthly fee, and a PS network is charged by an amount of data packets being used. The communication apparatus 1 can determine a communication module for use based on the charge rate adopted by the service network, thus, selecting a communication module at a lower charge rate whenever possible. For example, the communication apparatus 1 can assign highest priority to the WiFi module and lower priority to a communication module with a higher charge rate. When the user returns home, the communication module 1 can switch to the free WiFi network automatically.

In some embodiments, the charging plan charges a fixed rate when a network traffic limit or call limit is not reached, thus, extra charges will be incurred for exceeding network traffic limits or call times. The network selection scheme can assign reduced priority to a communication network when the network traffic limit or call limit for the corresponding service network has been met.

The network selection scheme may select the communication module in the communication apparatus 1 based on network performance, thereby increasing service quality. For the multi-mode mobile communication device, each communication module may exhibit a different network performance. When the communication apparatus 1 is downloading data or accessing multimedia services, a communication module with high network performance can be used to reduce download time and increase service quality. Therefore, the communication apparatus 1 can assign a priority order to the communication modules according to the network performance thereof.

When the screen of the mobile communication device is unlocked or a PS associated application is initiated, an increased bandwidth may be in need to accommodate for an increased data requirement. For example, the increased bandwidth requirement may be anticipated when a multimedia application such as a Youtube website is initiated. The communication apparatus 1 can select a communication module based on the network performance priority.

During a system startup, the expiry times for the switch timer 102 and recovery timer 106 are increased to increase the probability of utilizing a higher performance network.

When using a communication module with a lower network performance, the communication controller 108 can place a communication module with a higher network performance into an idle mode or only turn parts of the module off without turning the power off completely, thereby decreasing the setup time for the higher performance communication module.

The communication apparatus 1 can activate more than one communication module whenever possible to increase the available bandwidth, and transmit data by the higher performance communication module, thereby optimizing the bandwidth utility. For example, the communication apparatus 1 can activate the LTE module and the WiMax module concurrently, communicate via the LTE module when the LTE network has better signal quality (than the WiMax network), and communicate via the WiMax module when the WiMax network shows better signal quality. In another example, the communication apparatus 1 can communicate via the LTE module when the LTE network has better QoS (than the WiMax network).

Although the network selection schemes based on the power saving, the cost saving, and the network performance are considered to be separate, those with ordinary skills in the art should recognize that a combination thereof may be implemented to accommodate for increased network performance and reduced power consumption and cost. For example, when the screen on the mobile communication device is locked or the network service is not in need, the power saving network selection scheme may be adopted. When the screen on the mobile communication device is unlocked or the network service is in need, the network performance and the power saving network selection scheme may be adopted, increasing network performance and reducing power requirements.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodi-

The invention claimed is:

1. A timing method, performed by a mobile communication device, comprising:
    activating a first communication module for communicating with a first service network;
    receiving updated information when the first communication module is active;
    determining and setting an expiry time for an adaptive timer based on the updated information;
    activating the adaptive timer to count to the determined expiry time; and
    activating a second communication module for communicating with a second service network when the adaptive timer expires;
    wherein the updated information comprises a plurality of sub-information to be used in a plurality of sub-conditions, wherein a priority is assigned to each sub-condition, and the timing method further comprises: determining a validity of each sub-condition according to each corresponding sub-information; and the determining and setting an expiry time step comprising determining and setting an expiry time based on the validity and priority of the sub-conditions.

2. The timing method of claim 1, wherein the updated information is associated with a connection status of a first communication connection established by the first communication module.

3. The timing method of claim 1, wherein the updated information is associated with a man-machine interface on the mobile communication device.

4. The timing method of claim 1, wherein the updated information is associated with first network information of the first service network in which the first communication module established a first communication connection with.

5. The timing method of claim 1, wherein the updated information is associated with a pattern of a user behavior for using the first communication module.

6. The timing method of claim 1, wherein the updated information is associated with a motion of the mobile communication device.

7. The timing method of claim 1, wherein the adaptive timer is a switch timer, and the timing method further comprises deactivating the first communication module when the determined expiry time expires.

8. The timing method of claim 7, further comprising activating the switch timer when a signal quality of a signal received by the first communication module is less than a signal quality threshold.

9. The timing method of claim 1, wherein the adaptive timer is a recovery timer, and the timing method further comprises scanning, by the second communication module, a cellular station in the second service network.

10. The timing method of claim 1, wherein the updated information comprises two sub-information, and the expiry time is determined based on the two sub-information.

11. A communication apparatus in a mobile communication device, comprising:
    a first communication module, configured to be activated for communicating with a first service network;
    a controller, comprising an adaptive timer, configured to receive updated information when the first communication module is active, determine and set an expiry time for an adaptive timer based on the updated information, and activate the adaptive timer to count to the determined expiry time; and
    a second communication module, configured to be activated for communicating with a second service network when the adaptive timer expires;
    wherein the updated information comprises a plurality of sub-information to be used in a plurality of sub-conditions, wherein a priority is assigned to each sub-condition, and the controller is configured to determine a validity of each sub-condition according to each corresponding sub-information, and determine the expiry time based on the validity and priority of the sub-conditions.

12. The communication apparatus of claim 11, wherein the updated information is associated with a connection status of a first communication connection established by the first communication module.

13. The communication module of claim 11, wherein the updated information is associated with a man-machine interface on the mobile communication device.

14. The communication apparatus of claim 11, wherein the updated information is associated with first network information of the first service network in which the first communication module established a first communication connection with.

15. The communication apparatus of claim 11, wherein the updated information is associated with a pattern of a user behavior for using the first communication module.

16. The communication apparatus of claim 11, wherein the updated information is associated with a motion of the mobile communication device.

17. The communication apparatus of claim 11, wherein the adaptive timer is a switch timer, and the first communication module is configured to be deactivated when the determined expiry time expires.

18. The communication apparatus of claim 16, wherein the first communication module is configured to receive a signal with a signal quality and the switch timer is configured to be activated when the signal quality is less than a signal quality threshold.

19. The communication apparatus of claim 11, wherein the adaptive timer is a recovery timer, and the second communication module is configured to scan a cellular station in the second service network.

20. The communication apparatus of claim 11, wherein the updated information comprises two sub-information, the controller is configured to determine the expiry time based on the two sub-information.

* * * * *